US012752879B2

(12) United States Patent
Yamada et al.

(10) Patent No.: US 12,752,879 B2
(45) Date of Patent: Oct. 6, 2026

(54) SADDLED VEHICLE

(71) Applicant: Honda Motor Co., Ltd., Tokyo (JP)

(72) Inventors: Tsuyoshi Yamada, Tokyo (JP); Masaomi Yamada, Tokyo (JP); Yoichi Nishida, Tokyo (JP); Shimpei Shikanai, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 685 days.

(21) Appl. No.: 18/126,749

(22) Filed: Mar. 27, 2023

(65) Prior Publication Data

US 2023/0303202 A1 Sep. 28, 2023

(30) Foreign Application Priority Data

Mar. 28, 2022 (JP) ................................ 2022-051183

(51) Int. Cl.
*B62K 25/28* (2006.01)
*B62K 25/04* (2006.01)

(52) U.S. Cl.
CPC ...... *B62K 25/283* (2013.01); *B62K 2025/044* (2013.01); *B62K 2201/04* (2013.01)

(58) Field of Classification Search
CPC ............ B62K 25/283; B62K 2025/044; B62K 2201/04; B62H 1/02
See application file for complete search history.

(56) References Cited

U.S. PATENT DOCUMENTS

| | | | | |
|---|---|---|---|---|
| 4,298,211 A * | 11/1981 | Shitamori | B62H 5/005 | 280/297 |
| 5,118,126 A * | 6/1992 | Yaple | B62H 1/04 | 254/423 |
| 5,234,225 A * | 8/1993 | Yaple | B62H 1/04 | 254/423 |

(Continued)

FOREIGN PATENT DOCUMENTS

| | | |
|---|---|---|
| DE | 102018126233 A1 | 4/2020 |
| JP | 63-188581 A | 8/1988 |

(Continued)

OTHER PUBLICATIONS

Japanese Notice of Reasons for Refusal for Japanese Application No. 2022-051183, dated Dec. 5, 2023, with an English translation.

*Primary Examiner* — Valentin Neacsu
*Assistant Examiner* — Michael R Stabley
(74) *Attorney, Agent, or Firm* — Birch, Stewart, Kolasch & Birch, LLP

(57) ABSTRACT

To provide a saddled vehicle whose center stand is set up with ease in a simplified structure. A rear suspension suspending a swingarm from a vehicle body has its total length varied by the drive of an actuator. A controller that controls the actuator is provided. By the controller expanding the rear suspension to a predetermined length according to an operation on an actuation switch, the swingarm swings downward to reach a position where a center stand will not touch a ground surface even if the center stand is unfolded to a fully unfolded position. Unfolding the center stand with the swingarm swung downward and then letting the rear suspension recover its original length lifts the rear wheel off the ground surface to complete setting up the center stand.

9 Claims, 15 Drawing Sheets

(56) References Cited

U.S. PATENT DOCUMENTS

| | | | | | |
|---|---|---|---|---|---|
| 5,358,265 | A * | 10/1994 | Yaple | B62H 1/02 | 74/424.89 |
| 5,388,848 | A * | 2/1995 | Silva | B62H 1/06 | 280/304 |
| 5,553,471 | A * | 9/1996 | Hanners | B62H 5/005 | 248/688 |
| 6,536,792 | B2 * | 3/2003 | Strasser | B62H 1/02 | 280/293 |
| 6,905,126 | B1 * | 6/2005 | Jurrens | B60G 15/14 | 280/5.514 |
| 7,677,347 | B2 * | 3/2010 | Brawn | B62K 25/283 | 180/227 |
| 9,085,342 | B2 * | 7/2015 | Jauvtis | B62M 6/60 | |
| 9,738,339 | B1 * | 8/2017 | Jain | B62J 45/42 | |
| 10,000,252 | B2 * | 6/2018 | Takaya | B62K 11/04 | |
| 10,029,753 | B2 * | 7/2018 | Ramraika | B62H 1/02 | |
| 11,718,363 | B2 * | 8/2023 | Costa | B62K 25/04 | 280/124.16 |
| 2005/0156403 | A1 * | 7/2005 | Labonte | B62H 1/00 | 280/304 |
| 2017/0057315 | A1 * | 3/2017 | Rutherford | F16F 9/56 | |

FOREIGN PATENT DOCUMENTS

| | | | |
|---|---|---|---|
| JP | 2-109786 | A | 4/1990 |
| JP | 3-55728 | A | 3/1991 |

* cited by examiner

SADDLED VEHICLE

BACKGROUND

1. Technical Field

The present invention relates to a saddled vehicle. Specifically, the present invention relates to a saddled vehicle that includes a center stand that retains a vehicle body upright with a rear wheel lifted off the ground surface.

2. Description of the Background

Conventionally, there are known saddled vehicles that include a center stand that retains the vehicle body upright with a rear wheel lifted off the ground surface. In setting up the center stand, after the rider lets the center stand touch the ground surface, the rider must exert great force to lift the rear of the vehicle body. Thus, setting up the center stand can be difficult with vehicles with large weights.

Patent Literature 1 discloses a motorcycle that includes a swingarm swingably held on a vehicle body to hold a rear wheel. In Patent Literature 1, an actuator increases the droop angle of the swingarm to raise the vehicle height so that the rider can easily set up a center stand.

CITATION LIST

Patent Literature

Patent Literature 1: DE 102018126233 A1

BRIEF SUMMARY

The technique disclosed in Patent Literature 1 requires a dedicated actuator for changing the droop angle of the swingarm, which disadvantageously increases the number of components and weight.

An object of the present invention is to solve the problem of Patent Literature 1, and to provide a saddled vehicle whose center stand is set up with ease in a simplified structure.

In order to achieve the object, a first aspect of the present invention provides a saddled vehicle including: a center stand (11) that retains a vehicle body upright with a rear wheel (WR) lifted off a ground surface (G); a swingarm (12) that pivotally holds the rear wheel (WR) and is swingably held on the vehicle body by a swingarm pivot (9); and a rear suspension (14, 50) that suspends the swingarm (12) from the vehicle body. The rear suspension (14, 50) has its total length varied by drive of an actuator (25, 67). The saddled vehicle (1) further includes a controller (42) that controls the actuator (25, 67). When the controller (42) expands the rear suspension (14) to a predetermined length according to an operation on an actuation switch (40), the swingarm (12) swings downward to reach a position where the center stand (11) will not touch the ground surface (G) even if the center stand (11) is unfolded to a fully unfolded position. Unfolding the center stand (11) with the swingarm (12) swung downward and then letting the rear suspension (14) recover its original length lifts the rear wheel (WR) off the ground surface (G) to complete setting up the center stand.

A second aspect further includes a center stand angle sensor (43) that detects an unfolding angle of the center stand (11). The controller (42) detects that the center stand (11) has been unfolded to the fully unfolded position and lets the rear suspension (14, 50) recover its original length.

In a third aspect, the controller (42) makes an output signal of the actuation switch (40) valid only when an ignition switch (41) of the saddled vehicle (1) is being turned off.

A fourth aspect further includes a center stand drive motor (44) that unfolds the center stand (11). When the controller (42) detects that the rear suspension (14) has expanded to a predetermined length according to an operation on the actuation switch (40), the controller (42) unfolds the center stand (11) by the center stand drive motor (44). When the controller (42) detects that the center stand (11) has been unfolded to the fully unfolded position, the controller (42) lets the rear suspension (14) recover its original length.

The first aspect provides a saddled vehicle including: a center stand (11) that retains a vehicle body upright with a rear wheel (WR) lifted off a ground surface (G); a swingarm (12) that pivotally holds the rear wheel (WR) and is swingably held on the vehicle body by a swingarm pivot (9); and a rear suspension (14, 50) that suspends the swingarm (12) from the vehicle body. The rear suspension (14, 50) has its total length varied by drive of an actuator (25, 67). The saddled vehicle (1) further includes a controller (42) that controls the actuator (25, 67). When the controller (42) expands the rear suspension (14) to a predetermined length according to an operation on an actuation switch (40), the swingarm (12) swings downward to reach a position where the center stand (11) will not touch the ground surface (G) even if the center stand (11) is unfolded to a fully unfolded position. Unfolding the center stand (11) with the swingarm (12) swung downward and then letting the rear suspension (14) recover its original length lifts the rear wheel (WR) off the ground surface (G) to complete setting up the center stand. Conventionally, in setting up the center stand, after the rider lets the center stand touch the ground surface, the rider must exert great force to lift the rear of the vehicle body. In the present aspect, by the rear suspension expanding and raising the vehicle height, the rider can unfold the center stand to the fully unfolded position with minimum force. Thereafter, by letting the rear suspension to recover its original length, the setting up the center stand is completed.

The second aspect further includes a center stand angle sensor (43) that detects an unfolding angle of the center stand (11). The controller (42) detects that the center stand (11) has been unfolded to the fully unfolded position and lets the rear suspension (14, 50) recover its original length. This prevents the vehicle height from being lowered when the center stand is incompletely unfolded and ensures completing the setting up the center stand.

In the third aspect, the controller (42) makes an output signal of the actuation switch (40) valid only when an ignition switch (41) of the saddled vehicle (1) is being turned off. Thus, for example, the vehicle height will not change even if the rider accidentally operates the actuation switch during riding. This gives the rider the higher sense of security.

The fourth aspect further includes a center stand drive motor (44) that unfolds the center stand (11). When the controller (42) detects that the rear suspension (14) has expanded to a predetermined length according to an operation on the actuation switch (40), the controller (42) unfolds the center stand (11) by the center stand drive motor (44). When the controller (42) detects that the center stand (11) has been unfolded to the fully unfolded position, the controller (42) lets the rear suspension (14) recover its original length. Therefore, the setting up the center stand is automatically completed by a single operation on the actuation switch.

DETAILED DESCRIPTION

Figure 1:
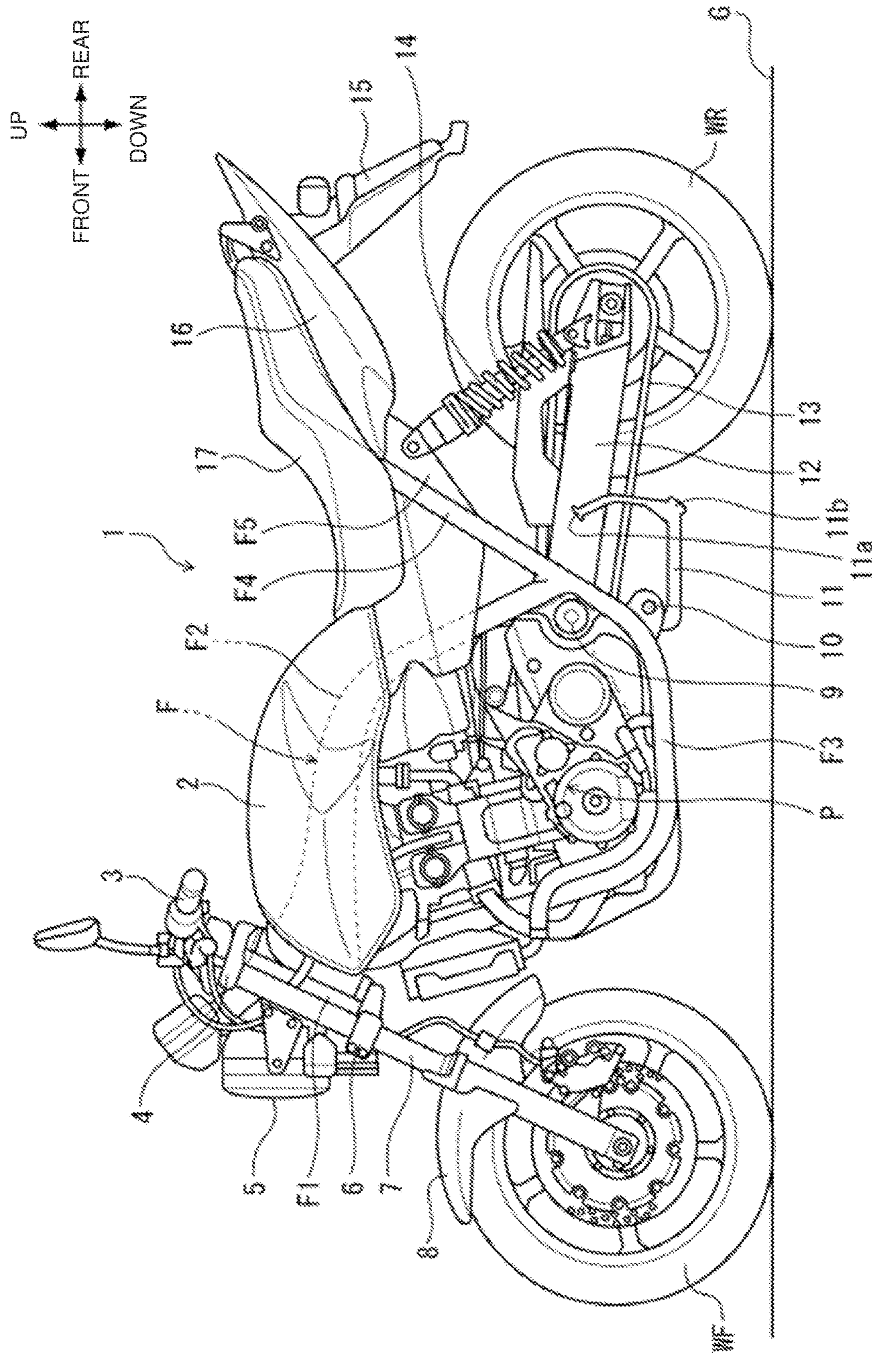
FIG. 1 is a left-side view of a motorcycle according to the present embodiment.

In the following, with reference to the drawings, a detailed description will be given of preferred embodiments of the present invention. FIG. 1 is a left-side view of a motorcycle 1 according to the present embodiment. The motorcycle 1 is a saddled vehicle that travels by transmitting the drive of a power unit P to a rear wheel WR via a drive chain 13. At the front end of a main frame F2 forming a vehicle frame F, a head pipe F1 that rotatably supports a steering stem (not shown) is provided.

A top bridge 4 is fixed to the upper part of the steering stem. A bottom bridge 6 is fixed to the lower part of the steering stem. A steering handlebar 3 for steering a front wheel WF is fixed to the upper part of the top bridge 4. The front wheel WF is rotatably held by the lower end of a pair of right and left front forks 7 that are held by the top bridge 4 and the bottom bridge 6. A front fender 8 is mounted on the front forks 7 to cover the front wheel WF from above.

A power unit P, made up of integrated engine and transmission, is disposed between the main frame F2 extending rearward from the head pipe F1 and under frames F3 extending steeply downward toward the rear from the head pipe F1. The right and left pair of under frames F3 extend rearward below the power unit P, then extend upward toward the rear to be coupled to a pair of right and left rear frames F4. The rear frames F4 are provided with rear suspension holders F5 for holding the upper ends of a right and left pair of rear suspensions 14.

A swingarm pivot 9 swingably holding a swingarm 12 is provided at the rear end of the main frame F2 where it joins the under frames F3. The rear part of the swingarm 12 that rotatably holds the rear wheel WR is suspended from the rear suspension holders F5 by the rear suspensions 14.

A fuel tank 2 shaped to straddle the main frame F2 is disposed on the main frame F2. A seat 17 is disposed behind the fuel tank 2. A rear fender 15 covering the rear wheel WR from above is mounted on a pair of right and left rear cowls 16 that cover the seat 17 from below.

A swing shaft 10 that swingably holds a center stand 11 is provided under the swingarm pivot 9 and at the rear bottom ends of the under frames F3. The center stand 11, which is for retaining the vehicle body upright with the rear wheel WR lifted off the ground surface G in parking, includes a step part 11*a* that the rider steps on in unfolding the center stand 11 and a ground part 11*b* that stands on the ground surface G. The center stand 11 is unfolded from a retracted position to a fully unfolded position and is biased toward the retracting direction by a return spring.

The rear suspensions 14 have its length adjusted by the drive of an actuator. The motorcycle 1 according to the present embodiment is characterized in that the length of the rear suspensions 14 is varied to facilitate the operation of setting up the center stand 11. FIG. 1 shows the rear suspensions 14 in their normal length.

Figure 2:
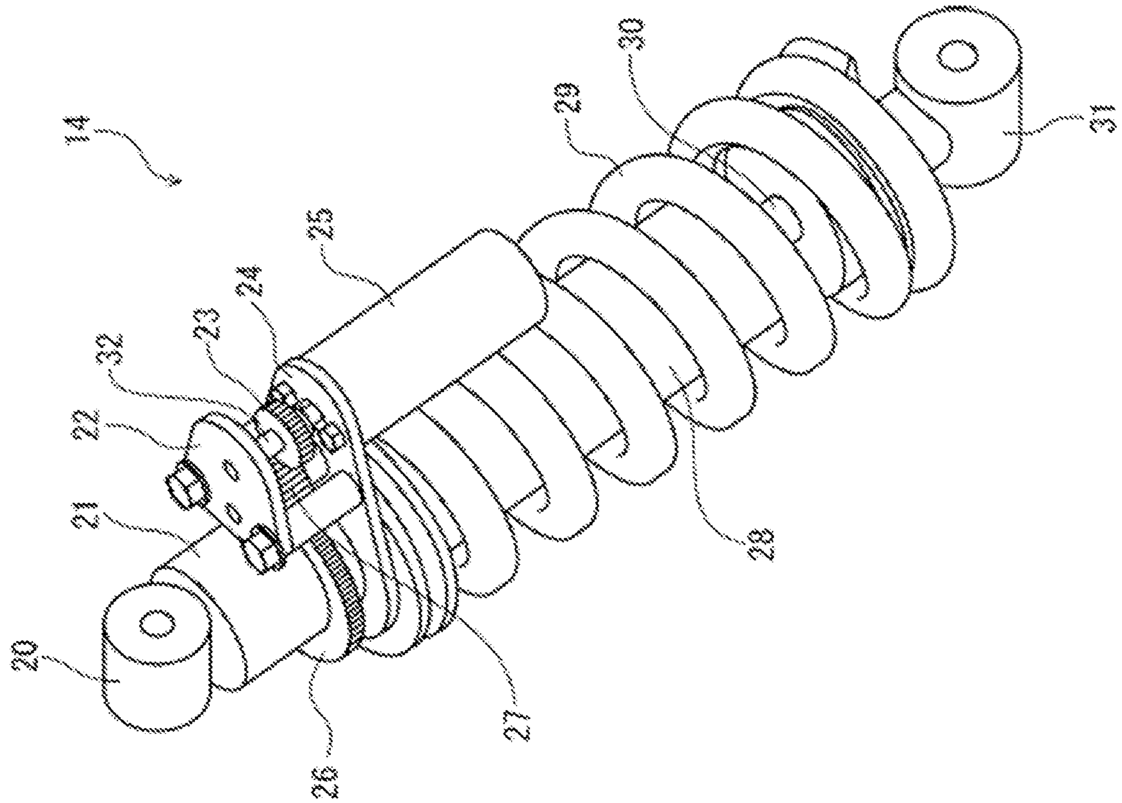
FIG. 2 is a perspective view of a rear suspension.
Figure 3:
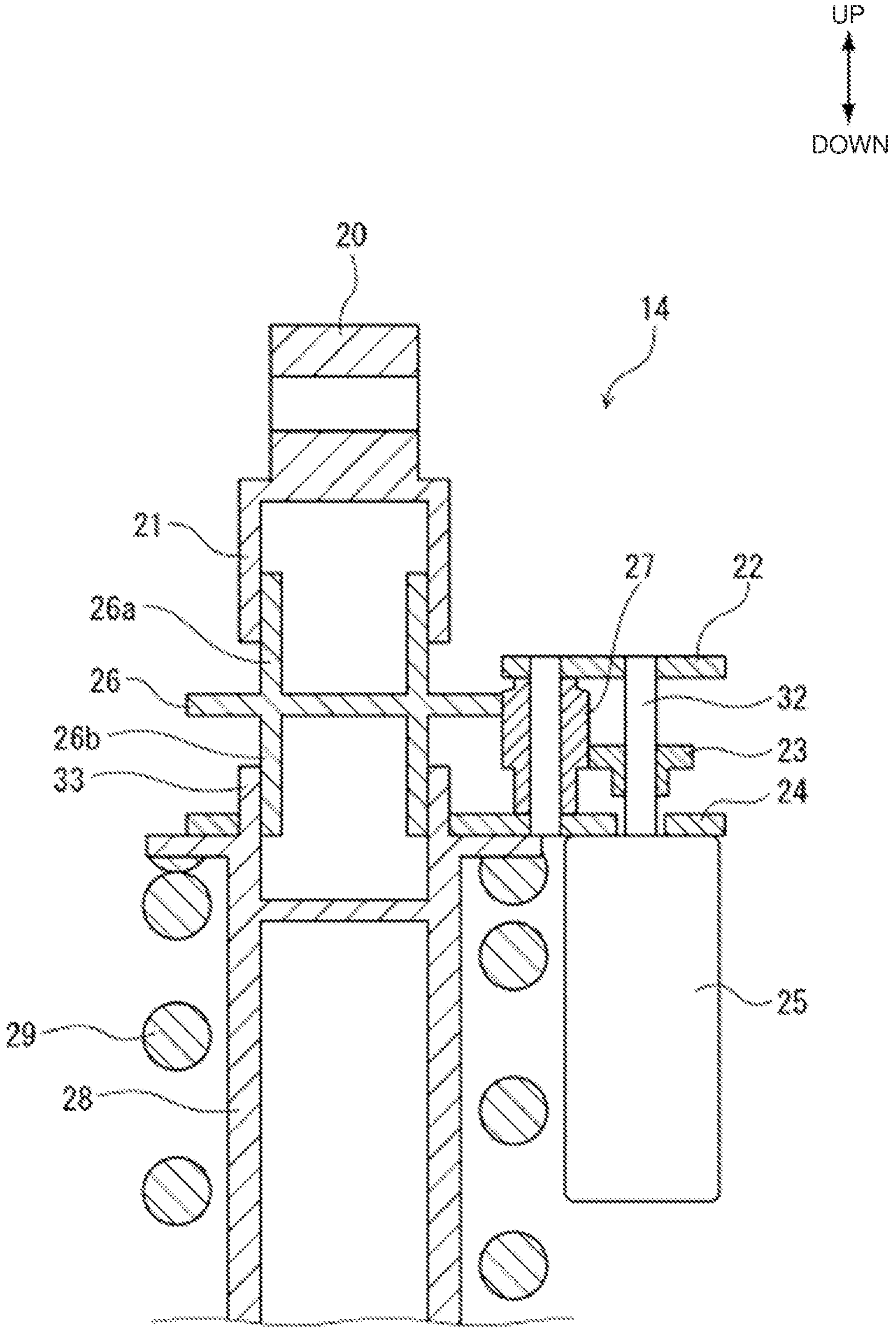
FIG. 3 is a cross-sectional view of the rear suspension.

FIG. 2 is a perspective view of one of the rear suspensions 14. FIG. 3 is a cross-sectional view of the rear suspension 14. The rear suspension 14 has a well-known body, being made up of a damper body 28, a damper shaft 30 inserted into the damper body 28, and a coil spring 29 wound around the damper body 28. An upper holder 20 pivotally held on the rear suspension holder F5 is provided at the upper end of the rear suspension 14, and a lower holder 31 pivotally held on the swingarm 12 is provided at the lower end of the rear suspension 14.

A length adjusting mechanism of the rear suspension 14 is provided between the upper holder 20 and the damper body 28. The inner circumferential surface of an upper outer tube 21 formed at the lower part of the upper holder 20 and the inner circumferential surface of a lower outer tube 33 provided at the upper part of the damper body 28 are female-threaded. A third gear 26 is screwed between the upper outer tube 21 and the lower outer tube 33. The third gear 26 integrally includes an upper inner tube 26*a* with a forward thread and a lower inner tube 26*b* with a reverse thread. A rotation of the third gear 26 varies the distance between the upper outer tube 21 and the lower outer tube 33 and the total length of the rear suspension 14 increases or reduces.

A motor 25 as an actuator is fixed to a lower support plate 24 mounted on the upper end of the damper body 28. Between the lower support plate 24 and the upper support plate 22, a first gear 23 and a second gear 27 fixed to a motor shaft 32 is disposed. The drive of the motor 25 is transmitted to the third gear 26 via the first gear 23 and the second gear 27.

Figure 4:
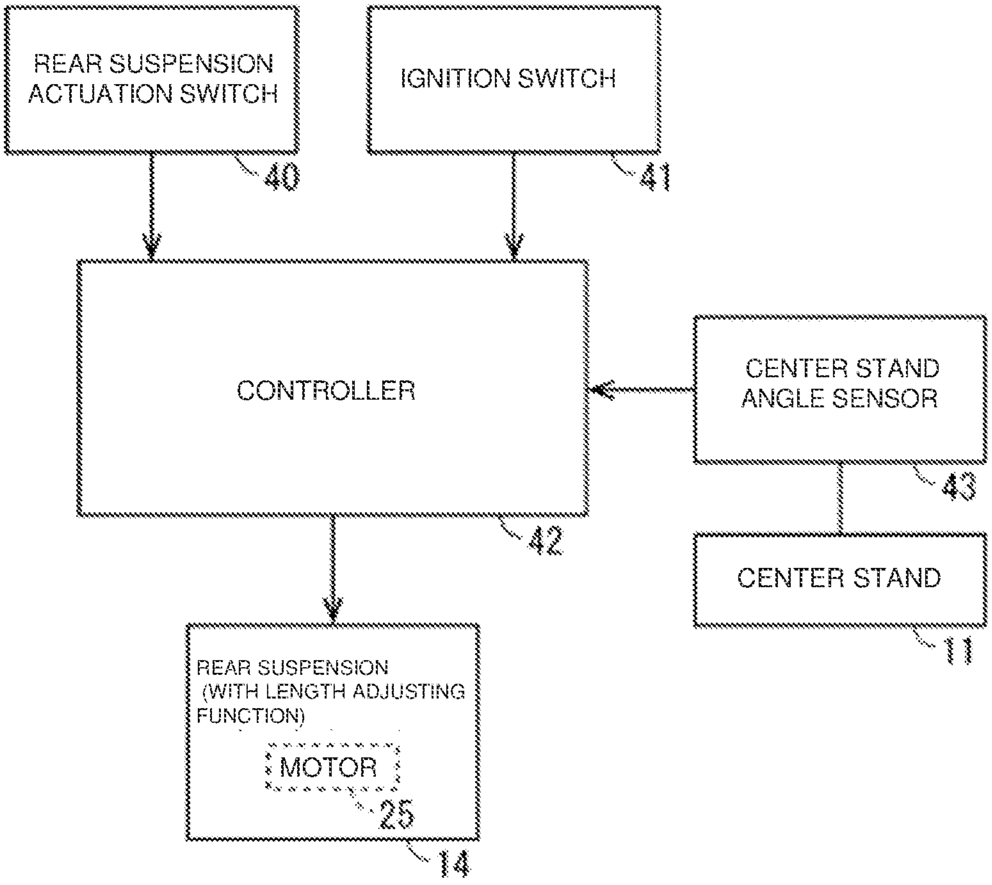
FIG. 4 is a block diagram of a control system of the rear suspension.

FIG. 4 is a block diagram of a control system of the rear suspensions 14. A controller 42 receives output signals from a rear suspension actuation switch 40, an ignition switch 41 for turning on/off the main power supply of the motorcycle 1, and a center stand angle sensor 43 that detects the unfolding angle of the center stand 11. The rear suspension actuation switch 40 is a switch that the rider operates at any timing in setting up the center stand 11. The controller 42 drives the motor 25 of each of the rear suspensions 14 according to the output signal to vary the length of the rear suspensions 14. The rear suspension actuation switch 40 may be disposed at the steering handlebar 2 or the rear suspension holder F5, for example.

Figure 5:
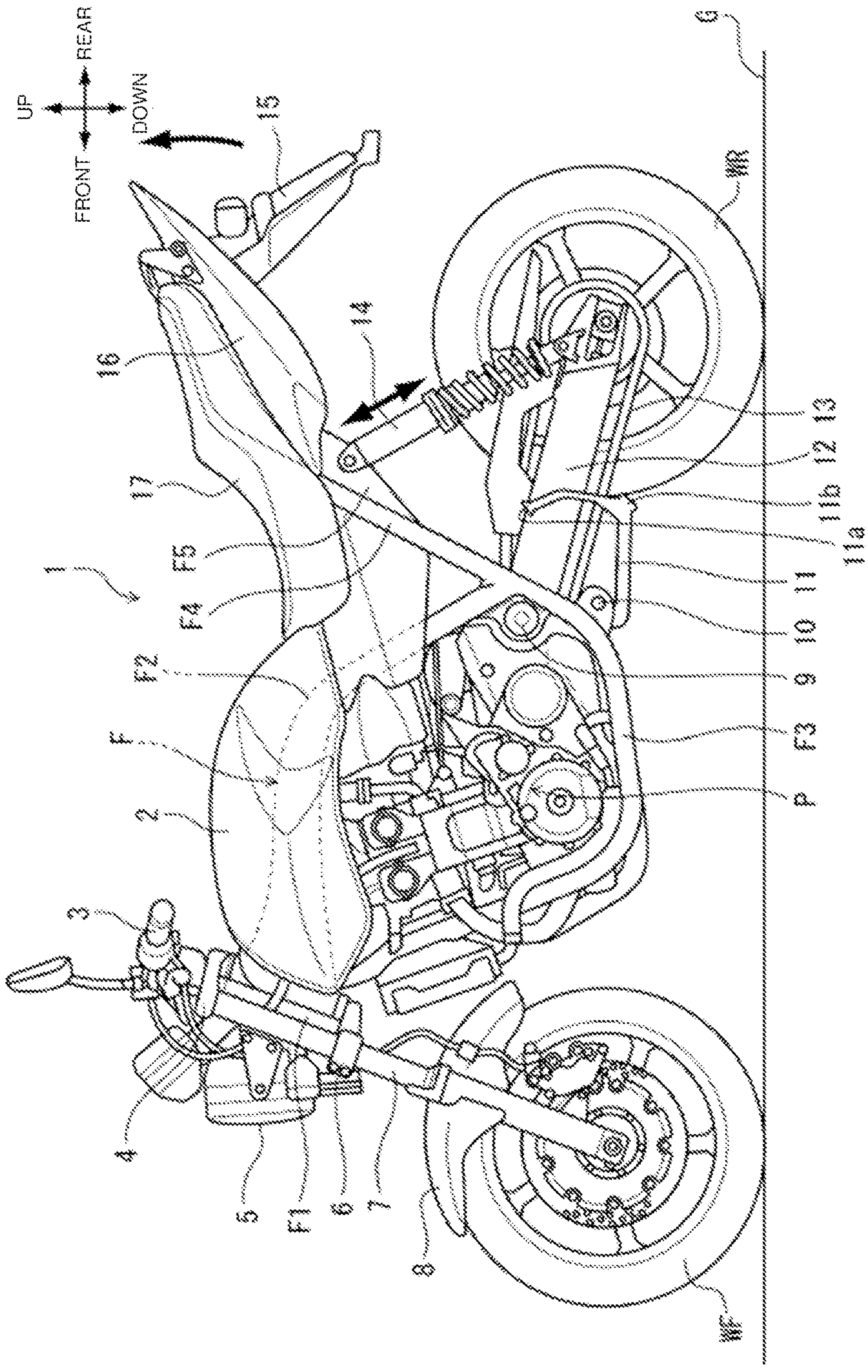
FIG. 5 is a left-side view of a motorcycle with its rear suspensions expanded to raise the vehicle height.

FIG. 5 is a left-side view of the motorcycle 1 with its rear suspensions 14 expanded to raise the vehicle height. In the present embodiment, by the rider operating the rear suspension actuation switch 40 while parking and the ignition switch 41 is turned off, the rear suspensions 14 expand to a predetermined length to swing the swingarm 12 downward, raising the vehicle height to a predetermined height.

Figure 6:
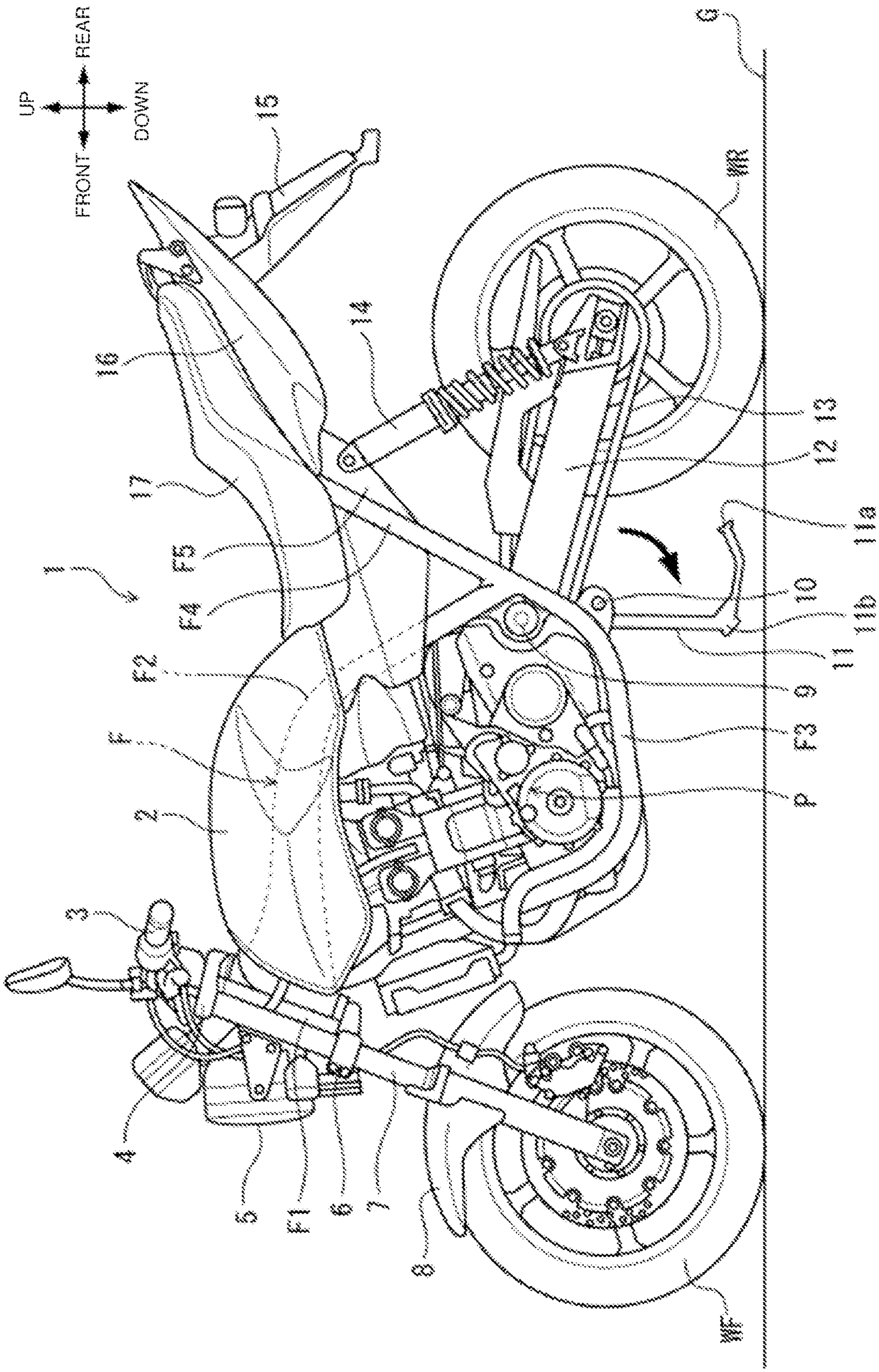
FIG. 6 is a left-side view of the motorcycle with its center stand unfolded to a fully unfolded position.

FIG. 6 is a left-side view of the motorcycle 1 with its center stand 11 unfolded to a fully unfolded position. When the rear suspensions 14 expand to a predetermined length and the vehicle height is raised to a predetermined height, the center stand 11 will not touch the ground surface G even when unfolded. This allows the rider to unfold the center stand 11 to the fully unfolded position with minimum force.

Figure 7:
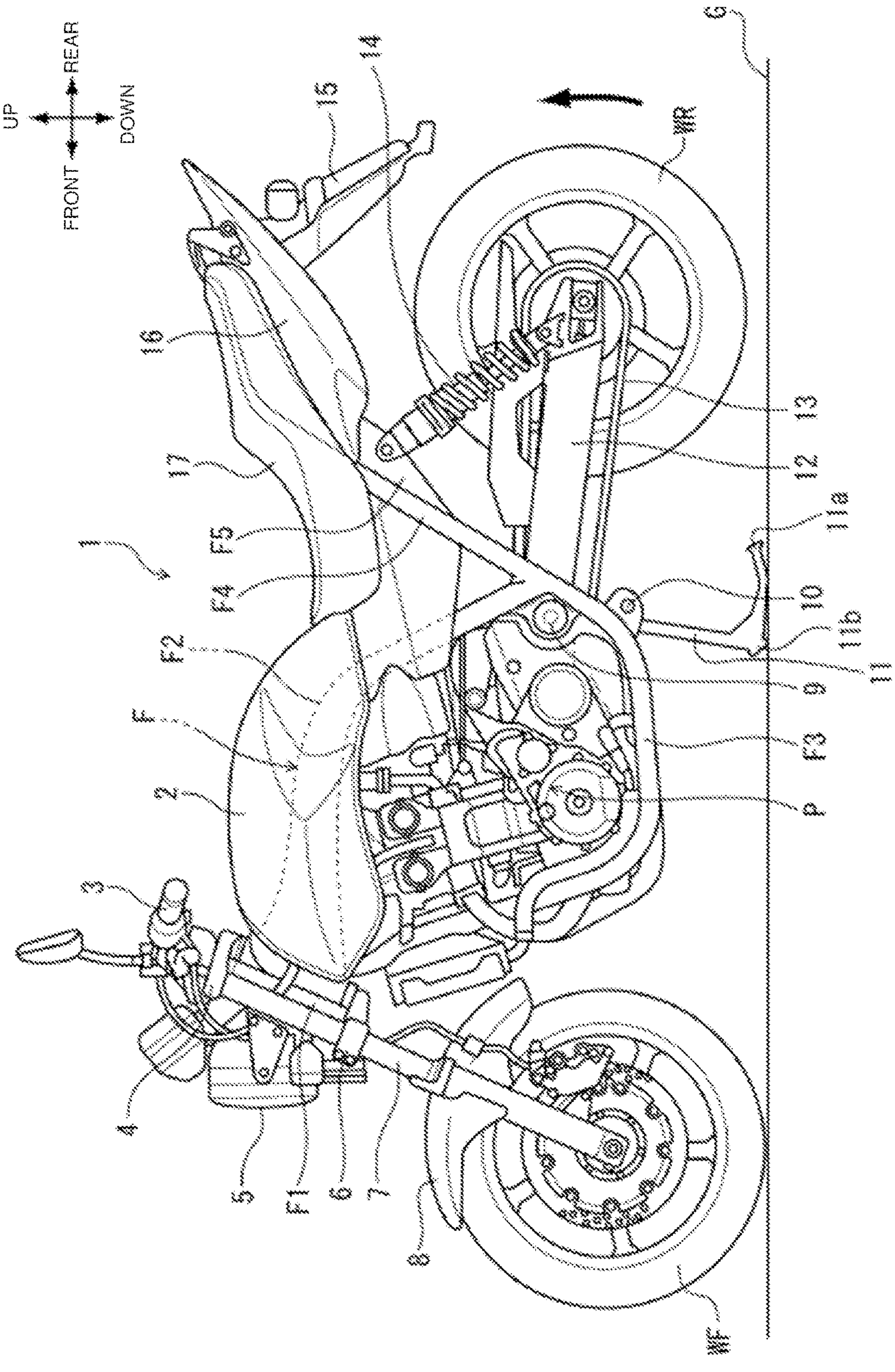
FIG. 7 is a left-side view of a motorcycle with its rear suspensions recovering the original length.

FIG. 7 is a left-side view of the motorcycle 1 with its rear suspensions 14 recovering their original length. When the rear suspensions 14 recover their original length with the center stand 11 unfolded to the fully unfolded position, the rear wheel WR is lifted off the ground surface G, completing the operation of setting up the center stand 11. In the present embodiment, by the rider operating the rear suspension actuation switch 40 in the state where the center stand 11 is unfolded to the fully unfolded position, the rear suspensions 14 recover their original length. Here, the rear suspensions 14 may automatically recover their original length in response to detecting the center stand 11 unfolded to the fully unfolded position.

Figure 8:
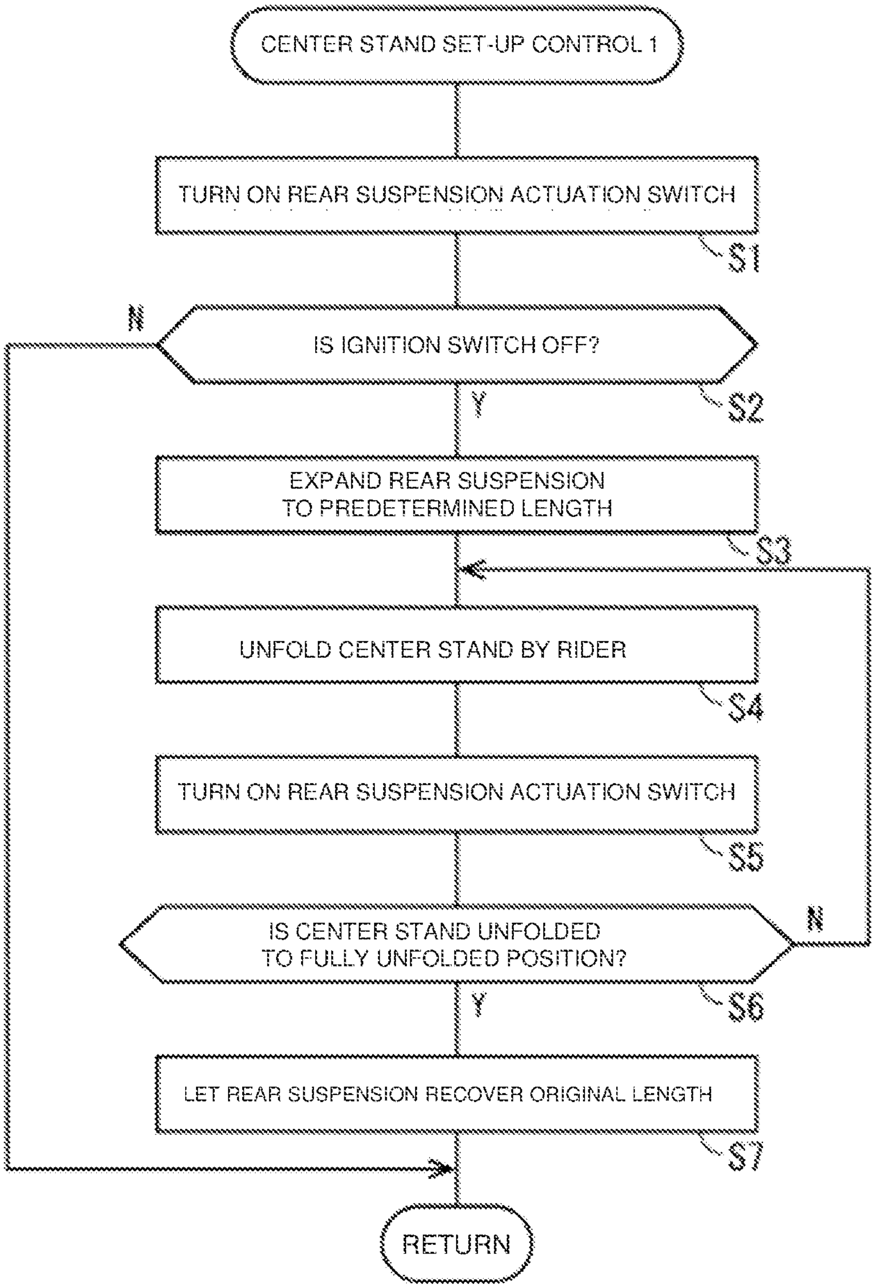
FIG. 8 is a flowchart of the procedure of center stand set-up control 1.

FIG. 8 is a flowchart of the procedure of center stand set-up control 1. In step S1, the rear suspension actuation switch 40 is turned on. In step S2, whether the ignition switch 41 is off is determined. When a positive determination is made in step S2, control proceeds to step S3 and let the rear suspensions 14 expand to a predetermined length.

On the other hand, when a negative determination is made in step S2, the series of control ends. That is, the controller 42 makes the output signal of the rear suspension actuation switch 40 valid only when the ignition switch 41 is being turned off. Thus, for example, the vehicle height will not change even if the rider accidentally operates the rear suspension actuation switch 40 during riding. This gives the rider the higher sense of security.

In the following step S4, the rider unfolds the center stand 11 to the fully unfolded position. In step S5, the rear suspension actuation switch 40 is turned on. In step S6, whether the center stand 11 is unfolded to the fully unfolded position is determined. When a positive determination is made, control proceeds to step S7. In step S7, the rear suspensions 14 recover their original length and the series of control ends.

When a negative determination is made in step S6, control returns to step S4. That is, the controller 42 detects that the center stand 11 has unfolded to reach the fully unfolded position and allows the rear suspensions 14 to recover their original length. This prevents the vehicle height from being lowered when the center stand 11 is insufficiently unfolded and ensures completing the setting up the center stand.

Figure 9:
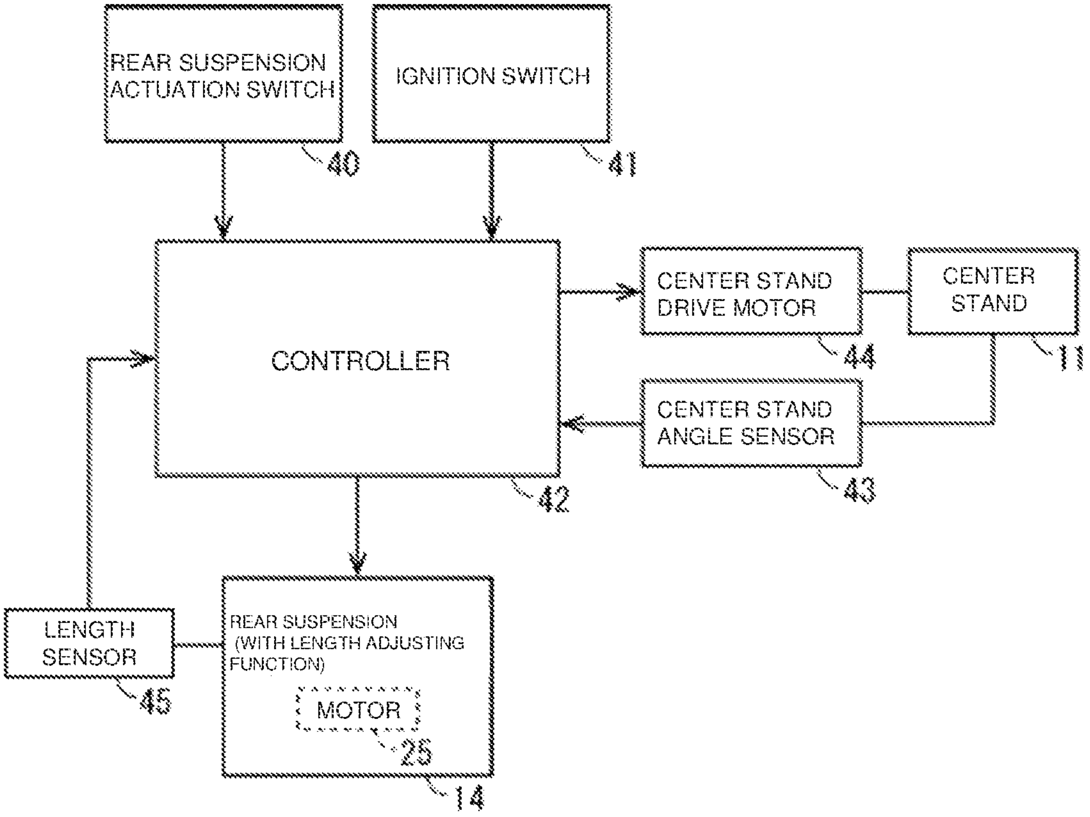
FIG. 9 is a block diagram of a control system of a rear suspension according to a variation of the present embodiment.

FIG. 9 is a block diagram of a control system of rear suspensions 14 according to a variation of the present embodiment. The same reference characters represent the identical or equivalent parts. The variation is different from the structure in FIG. 4 in further including a center stand drive motor 44 that performs the unfolding operation of the center stand 11 and a length sensor 45 that detects the length of the rear suspensions 14.

Figure 10:
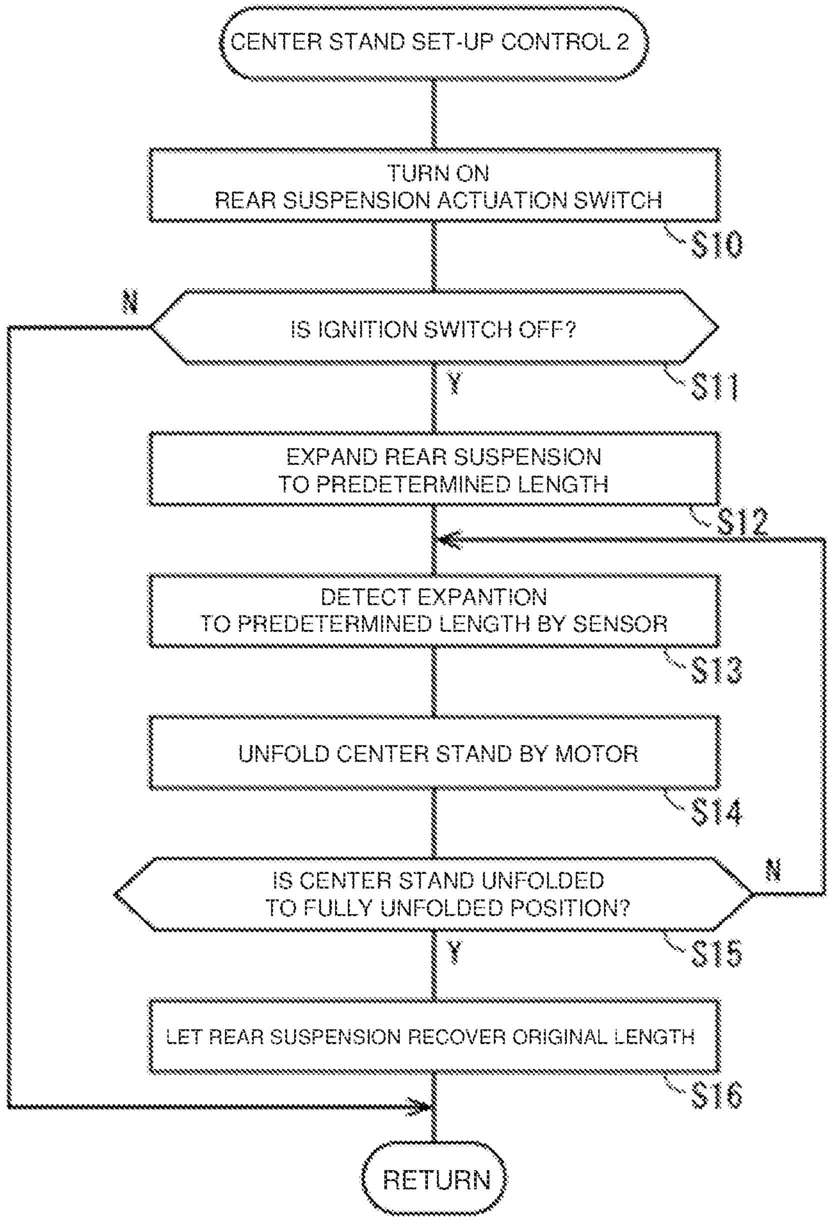
FIG. 10 is a flowchart of the procedure of center stand set-up control 2.

FIG. 10 is a flowchart of the procedure of center stand set-up control 2. In step S10, the rear suspension actuation switch 40 is turned on. In step S11, whether the ignition switch 41 is off is determined. When a positive determination is made in step S11, control proceeds to step S12 and let the rear suspensions 14 expand to a predetermined length. On the other hand, when a negative determination is made in step S11, the series of control ends.

In the following step S13, the length sensor 45 detects that the rear suspensions 14 have expanded to a predetermined length. In step S14, by being triggered by the rear suspensions 14 expanding to a predetermined length, the center stand drive motor 44 unfolds the center stand 11.

In step S15, whether the center stand 11 has been unfolded to the fully unfolded position is determined. When a positive determination is made, control proceeds to step S16. In step S16, the rear suspensions 14 recover their original length, and the series of control ends. On the other hand, when a negative determination is made in step S15, control returns to step S13.

Figure 11:
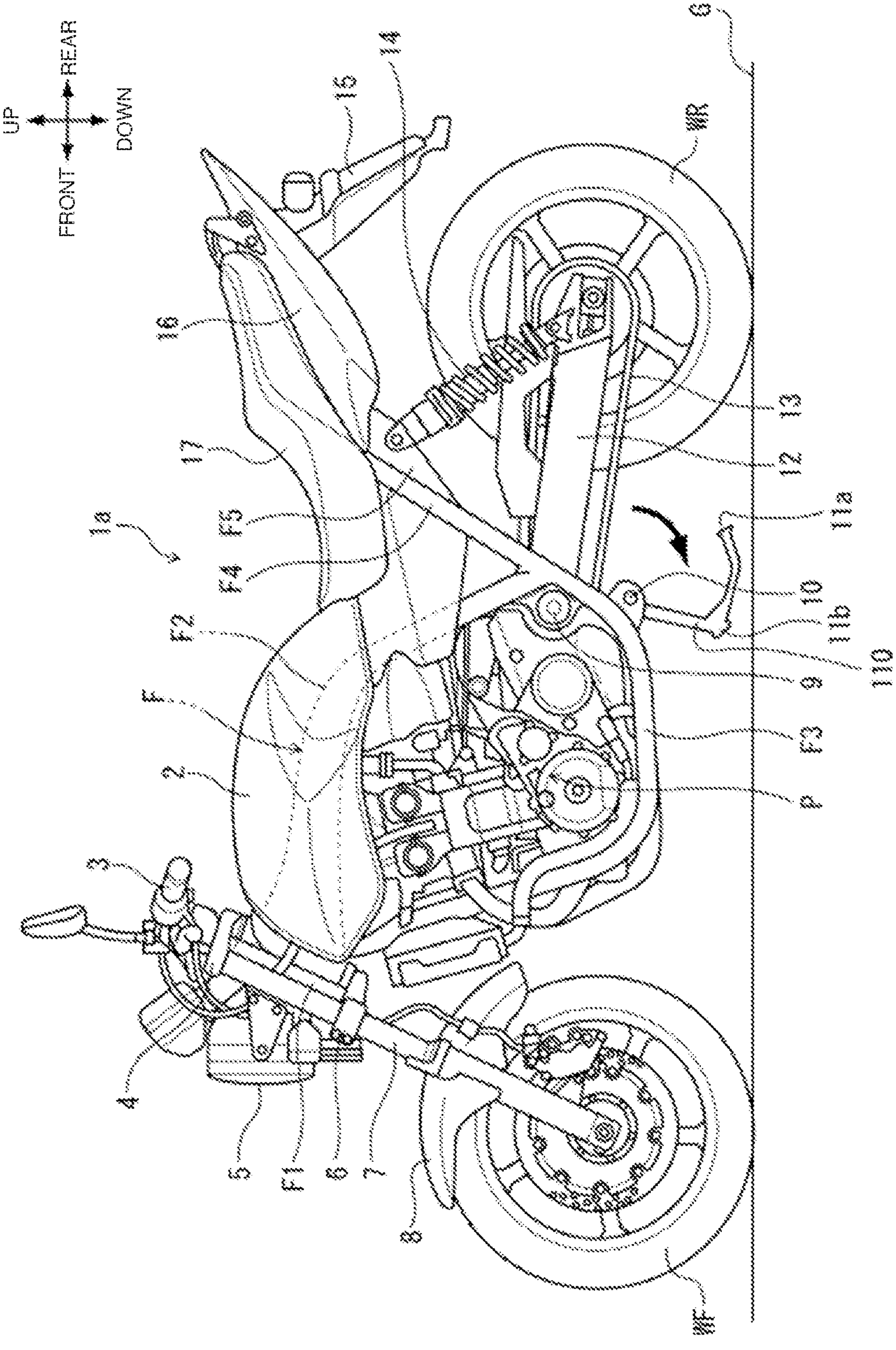
FIG. 11 is a left-side view of a motorcycle according to a second embodiment of the present invention.

FIG. 11 is a left-side view of a motorcycle 1*a* according to a second embodiment of the present invention. The same reference characters represent the identical or equivalent parts. The present embodiment employs a center stand 110 whose top-bottom length when unfolded is shorter, and is characterized in that the rear suspensions 14 compress to a predetermined length according to an operation on the rear suspension actuation switch 40. As shown in the drawing, the present embodiment employs the center stand 110 whose top-bottom length is shorter. Therefore, despite the rear suspensions 14 being in normal length, the center stand 110 can be unfolded to the fully unfolded position without touching the ground surface G.

Figure 12:
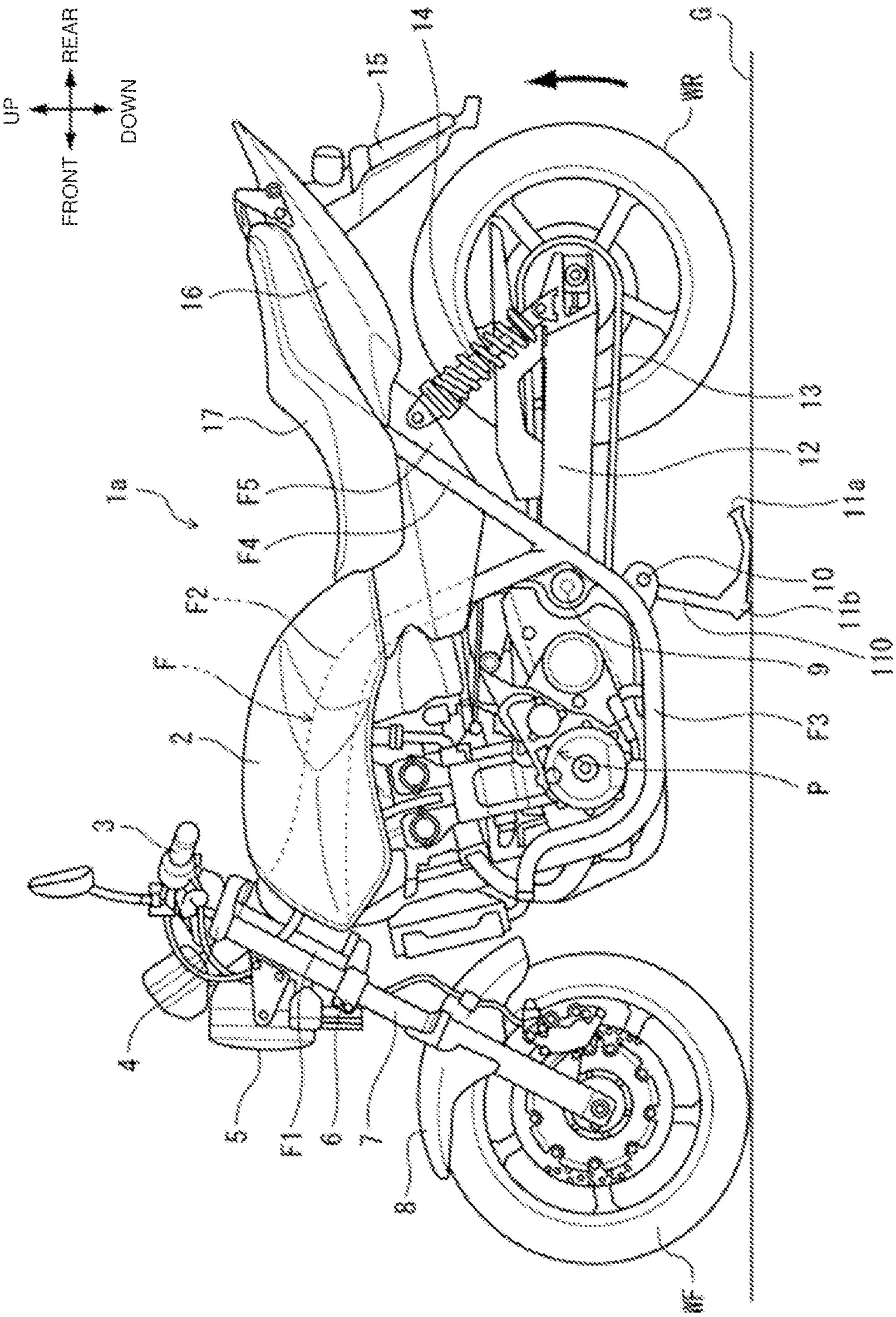
FIG. 12 is a left-side view of the motorcycle with its center stand unfolded to the fully unfolded position and its rear suspension compressed.

FIG. 12 is a left-side view of the motorcycle 1*a* with its center stand 110 unfolded to the fully unfolded position and its rear suspension 14 compressed. When the rear suspensions 14 are compressed to a predetermined length with the center stand 110 unfolded, the rear wheel WR is lifted off the ground surface G, completing the setting up the center stand. Thus, the operation of setting up the center stand 110 is done with ease.

Figure 13:
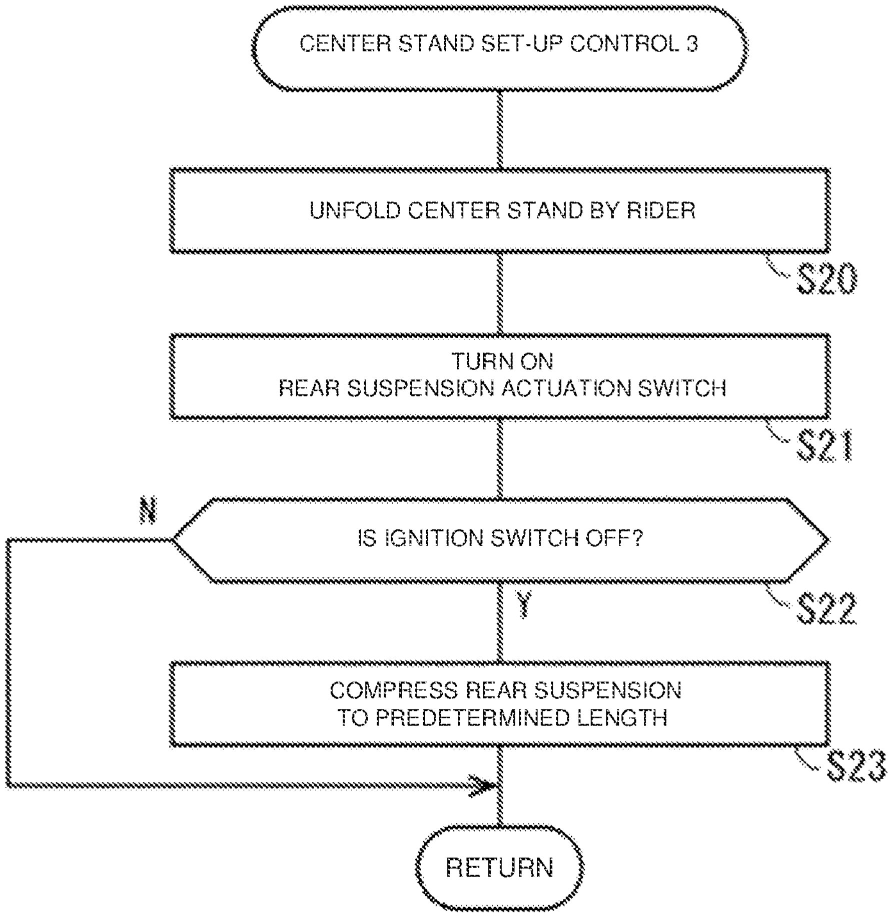
FIG. 13 is a flowchart of the procedure of center stand set-up control 3.

FIG. 13 is a flowchart of the procedure of center stand set-up control 3. In step S20, the rider unfolds the center stand 110 to the fully unfolded position. In step S21, the rear suspension actuation switch 40 is turned on. In step S22, whether the ignition switch 41 is off is determined. When a positive determination is made in step S22, control proceeds to step S23 and compress the rear suspensions 14 to a predetermined length. This completes the setting up the center stand and the series of control ends.

On the other hand, when a negative determination is made in step S22, the series of control ends. Thus, for example, the vehicle height will not change even if the rider accidentally operates the rear suspension actuation switch 40 during riding. This gives the rider the higher sense of security. In the present embodiment also, the rear suspensions 14 may be automatically compressed by being triggered by the center stand 110 unfolded to the fully unfolded position.

Figure 14:
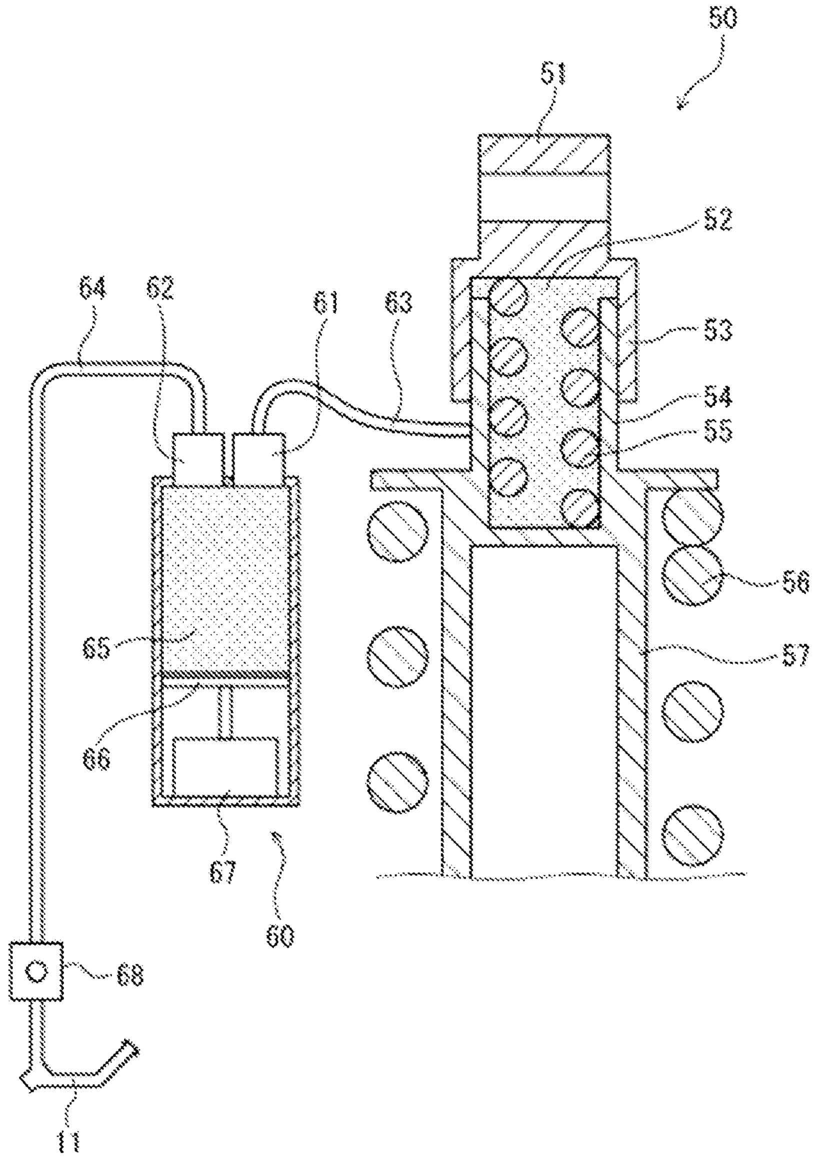
FIG. 14 is a cross-sectional view of the rear suspension having a hydraulic expansion mechanism.

FIG. 14 is a cross-sectional view of one of rear suspensions 50 having a hydraulic expansion mechanism. The above-described embodiments employ the rear suspensions 17 of a mechanical expansion mechanism. Here, the expansion mechanism may be hydraulic. The rear suspension 50 has a well-known body, being made up of a damper body 57 and a coil spring 56 wound around the damper body 57. An upper holder 51 held on the rear suspension holder F5 is provided at the upper end of the rear suspension 50.

A length adjusting mechanism of the rear suspension 50 is disposed between the upper holder 51 and the damper body 57. An inner tube 54 provided at the upper part the damper body 57 is slidably inserted into an outer tube 53 formed at the lower part the upper holder 51. A first hydraulic chamber 52 filled with hydraulic oil is formed between the outer tube 53 and the inner tube 54. The first hydraulic chamber 52 houses a coil spring 55 that biases the outer tube 53 and the inner tube 54 in the direction becoming far from each other.

A hydraulic pressure generating device 60 includes an oil pump 67 as an actuator. The actuated oil pump 67 pushes a hydraulic piston 66, to generate hydraulic pressure in a second hydraulic chamber 65. A first hose 63 coupled to a first valve 61 of the hydraulic pressure generating device 60 is coupled to the first hydraulic chamber 52 of the rear suspension 50. A second hose 64 coupled to a second valve 62 is coupled to a hydraulic center stand unfolding device 68 for unfolding the center stand 11.

Figure 15:
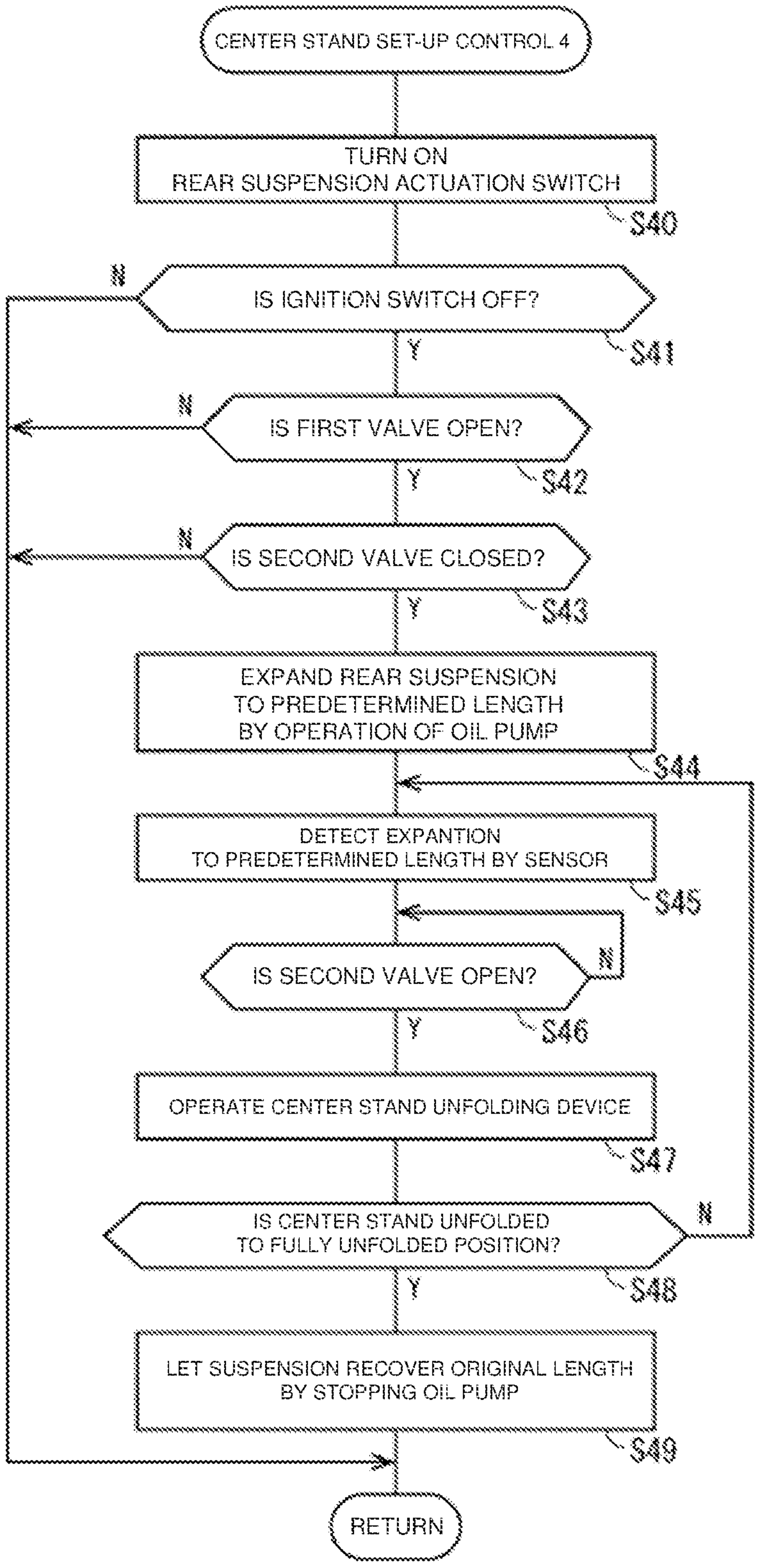
FIG. 15 is a flowchart of the procedure of center stand set-up control 4.

FIG. 15 is a flowchart of the procedure of center stand set-up control 4. The flowchart shows the procedure of setting up the center stand 11 of a standard length using the hydraulic system described with reference to FIG. 14. In step S40, the rear suspension actuation switch 40 is turned on. In step S41, whether the ignition switch 41 is off is determined. When a positive determination is made in step S41, control proceeds to step S42 to determine whether the first valve 61 is open.

When a positive determination is made in step S42, control proceeds to step S43 to determine whether the second valve 62 is closed. When a positive determination is made in step S43, control proceeds to step S44. In step S44, the rear suspensions 50 are expanded to a predetermined length by the operation of the oil pump 67. On the other hand, when a negative determination is made in steps S41, S42, S43, the series of control ends.

In step S45, the length sensor 45 detects that the rear suspensions 50 have expanded to a predetermined length. In the following step S46, whether the second valve 46 is open is determined. When a positive determination is made in step S46, control proceeds to step S47, where the center stand unfolding device 68 unfolds the center stand 11 by the operation of the oil pump 67. On the other hand, when a negative determination is made in step S46, control returns to the determination in step S46.

In the following step S48, whether the center stand 11 is unfolded to the fully unfolded position is determined. When a positive determination is made, control proceeds to step S49. In step S49, the rear suspensions 50 recover their original length by the oil pump 67 stopping its operation, and the series of control ends. On the other hand, when a negative determination is made in step S48, control returns to step S45.

As has been described above, the saddled vehicle of the present invention includes the rear suspensions whose length is varied by the drive of the actuator. The setting up the center stand is completed by unfolding the center stand with the rear suspensions expanded and letting the rear suspensions recover their original length. Thus, the operation of setting up the center stand is done with ease, i.e., the vehicle exhibits improved convenience.

Note that, the mode of the motorcycle, the shape or arrangement of the center stand, the structure of the rear suspensions, the expansion mechanism of the rear suspensions, and the configuration of the control system of the rear suspensions are not specified to those of the embodiments, and various changes can be made. For example, a combination of rear suspensions having a mechanical expansion mechanism and a hydraulic center stand unfolding device, or a combination of rear suspensions having a hydraulic expansion mechanism and a mechanical center stand unfolding device may be employed. The expansion structure of the rear suspensions of the present invention is not limited to a motorcycle including two rear suspensions, and is applicable to a motorcycle in which one rear suspension supports a swingarm, or a tricycle including two front wheels.

REFERENCE SIGNS LIST

1: motorcycle (saddled vehicle)
11: center stand
12: swingarm
14, 50: rear suspension
25: motor (actuator)
40: actuation switch
43: center stand angle sensor
41: ignition switch
44: center stand drive motor
67: oil pump (actuator)
WR: rear wheel
42: controller
G: ground surface

What is claimed is:

1. A saddled vehicle comprising:
a center stand that retains a vehicle body upright with a rear wheel lifted off a ground surface;
a swingarm that pivotally holds the rear wheel and is swingably held on the vehicle body by a swingarm pivot; and
a rear suspension that suspends the swingarm from the vehicle body,
wherein the rear suspension has its total length varied by drive of an actuator,
wherein the rear suspension includes the actuator that adjusts a length of the rear suspension,
wherein the saddled vehicle further comprising a controller that controls the actuator,
wherein, when the controller expands the rear suspension to a predetermined length according to an operation on an actuation switch, the swingarm swings downward to reach a position where the center stand will not touch the ground surface even if the center stand is unfolded to a fully unfolded position,
wherein unfolding the center stand with the swingarm swung downward and then letting the rear suspension recover its original length lifts the rear wheel off the ground surface to complete setting up the center stand,
wherein the rear suspension further includes:
a body portion including:
a coil spring; and
a damper body inserted into the coil spring; and
a holder connected to the vehicle body, and
wherein a length adjusting mechanism configured to adjust the length of the rear suspension is disposed between the body portion and the holder.

2. The saddled vehicle according to claim 1, further comprising a center stand angle sensor that detects an unfolding angle of the center stand, wherein the controller detects that the center stand has been unfolded to the fully unfolded position and allows the rear suspension to recover its original length.

3. The saddled vehicle according to claim 2, wherein the controller makes an output signal of the actuation switch valid only when an ignition switch of the saddled vehicle is being turned off.

4. The saddled vehicle according to claim 2, further comprising a center stand drive motor that unfolds the center stand, wherein when the controller detects that the rear suspension has expanded to a predetermined length according to an operation on the actuation switch, the controller unfolds the center stand by the center stand drive motor.

5. The saddled vehicle according to claim 1, further comprising a center stand drive motor that unfolds the center stand, wherein when the controller detects that the rear suspension has expanded to a predetermined length according to an operation on the actuation switch, the controller unfolds the center stand by the center stand drive motor, and when the controller detects that the center stand has been unfolded to the fully unfolded position, the controller lets the rear suspension recover its original length.

6. The saddled vehicle according to claim 1, wherein a longitudinal axis of the actuator is parallel to a longitudinal axis of the rear suspension.

7. A saddled vehicle comprising:

a center stand that retains a vehicle body upright with a rear wheel lifted off a ground surface;

a swingarm that pivotally holds the rear wheel and is swingably held on the vehicle body by a swingarm pivot; and a rear suspension that suspends the swingarm from the vehicle body, wherein the rear suspension has its total length varied by drive of an actuator, the saddled vehicle further comprising a controller that controls the actuator, wherein when the controller expands the rear suspension to a predetermined length according to an operation on an actuation switch, the swingarm swings downward to reach a position where the center stand will not touch the ground surface even if the center stand is unfolded to a fully unfolded position, wherein unfolding the center stand with the swingarm swung downward and then letting the rear suspension recover its original length lifts the rear wheel off the ground surface to complete setting up the center stand, and wherein the controller makes an output signal of the actuation switch valid only when an ignition switch of the saddled vehicle is being turned off.

8. The saddled vehicle according to claim 7, further comprising a center stand drive motor that unfolds the center stand, wherein when the controller detects that the rear suspension has expanded to a predetermined length according to an operation on the actuation switch, the controller unfolds the center stand by the center stand drive motor, and when the controller detects that the center stand has been unfolded to the fully unfolded position, the controller lets the rear suspension recover its original length.

9. A saddled vehicle comprising:

a center stand that retains a vehicle body upright with a rear wheel lifted off a ground surface;

a swingarm that pivotally holds the rear wheel and is swingably held on the vehicle body by a swingarm pivot; and a rear suspension that suspends the swingarm from the vehicle body, wherein the rear suspension has its total length varied by drive of an actuator, wherein the rear suspension includes the actuator that adjusts a length of the rear suspension, wherein the saddled vehicle further comprising a controller that controls the actuator, wherein, when the controller expands the rear suspension to a predetermined length according to an operation on an actuation switch, the swingarm swings downward to reach a position where the center stand will not touch the ground surface even if the center stand is unfolded to a fully unfolded position, wherein unfolding the center stand with the swingarm swung downward and then letting the rear suspension recover its original length lifts the rear wheel off the ground surface to complete setting up the center stand, wherein the actuator has a motor and a first gear, and wherein the rear suspension has a second gear driven by the first gear.

* * * * *